July 26, 1938.  G. W. REED  2,124,631

BATTERY CONNECTION

Filed Sept. 9, 1937.

INVENTOR
GEORGE W. REED
By Adam E. Fisher
ATTORNEY

Patented July 26, 1938

2,124,631

UNITED STATES PATENT OFFICE 2,124,631

BATTERY CONNECTION

George W. Reed, Wood, Wis.

Application September 9, 1937, Serial No. 162,996

1 Claim. (Cl. 173—259)

My invention relates to improvements in battery connections, and the primary object is to provide a device for making a connection between a battery cable and the terminal post of a storage battery in such manner that air and moisture are excluded from the actual connection and corrosion is prevented.

Another object is to provide a connection of this kind which is readily applied to or removed from the battery terminal post.

A further object is to provide a connection of this kind in a simple and durable form including a member carrying the cable and adapted to be inserted into a hole bored in the terminal post and therein expanded to make a firm electrical contact, and a cover assembly adapted to seat in air tight manner over the terminal post and exclude all corrosive elements therefrom.

These and still other more specific objects will become apparent in the course of the following specificaton, reference being had to the accompanying drawing, wherein Figure 1 is a vertical diametrical section through the battery connection and the terminal post;

Figure 1:
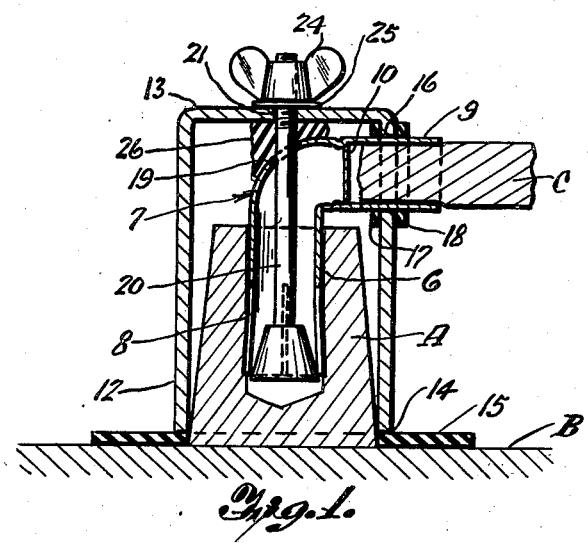
Figure 2:
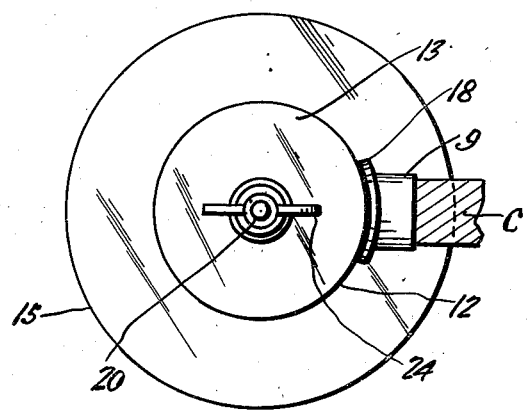
Figure 2 is a plan view.
Figure 5:
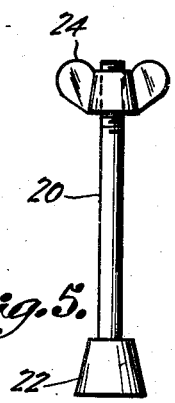
Figure 5 is a side elevation of the bolt assembly for expanding the connecting member in the terminal post.
Figure 3:
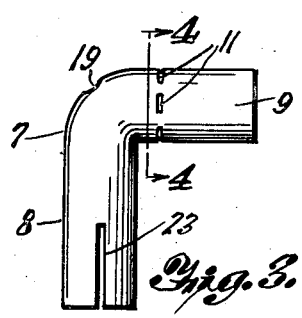
Figure 3 is a side elevation of the connecting member alone.
Figure 4:
Figure 4 is a cross section along the line 4—4 in Figure 3.

Referring now with more particularity to the drawing, the reference character A designates the usual terminal post of a storage battery B and in accordance with my invention, a hole or recess 6 is bored down into the center of the post A as shown. My improved battery connection then comprises a tubular connecting member 7 bent at right angles intermediate its ends to an L-shape with extended ends 8 and 9. The end 8 is adapted to fit nicely down into the recess 6 in the terminal post A and in this position the end 9 extends laterally and horizontally from the post. The battery cable C has its end sweated into this end 9 of the member 7 and inwardly of the cable the member is sealed by a disk 10 secured inside the bore of the member against bosses 11 which are punched inwardly from the walls.

A cup-shaped housing 12 is provided and is adapted to set in inverted position over the post A with the closed end 13 standing some distance above the post. The open lower end 14 then rests on a rubber washer 15 which is placed in the upper surface of the battery B around the post. An opening 16 is formed in the wall of the housing 12 to pass the end 9 of the member 7 and an air tight fit is provided at this point by means of inner and outer resilient washers 17 and 18 arranged in the manner shown.

An aperture 19 is formed in the member 7 at the outer portion of its medial bend so that the opening is aligned with the axis of the end 8 and will receive an expanding bolt 20 projected up through that end and thence upwardly through an aperture 21 formed centrally in the housing end 13. The lower end of the bolt 20 carries an integral trunco-conical expanding head 22 which enters the lower extremity of the end 8 of the member 7 but which is of greater diameter at its larger lower end than the bore of said member. This lower portion of the end 8 has radially spaced and longitudinally extended slits 23.

The upper end of the bolt 20 is threaded to receive a wing nut 24 which may be turned down against the housing end 13, or rather, against a washer 25 placed over the bolt as shown. A thick soft rubber washer 26 is placed over the bolt between the end 13 and the bend in the member 7.

In use the end 8 of the member 7 is inserted in the recess 6 in the terminal post A and the wing nut 24 is then turned down on the bolt 20 so that the head 22 is moved up into the end 8. This action expands the end 8 so that it "bites" into the walls of the recess 6 and makes a firm electrical and mechanical contact therewith. When the bolt 20 and member 7 are thus anchored on the post A, the nut 24 is further turned to force the housing 12 down against the washer 15 so that an air tight connection is formed and air, water, and the like are all prevented from coming in contact with the terminal post and causing corrosion. To remove the connection the nut 24 is simply unscrewed and the whole assembly pulled from the terminal post.

It is understood that minor changes may be made in the structure so long as they do not depart from the scope of the appended claim.

Having thus described my invention, what I claim as new and desire to secure by Letters Patent is:

In a device of the kind described, for use upon a battery terminal post having a bore extended longitudinally thereinto, a housing adapted to seat over the post, a tubular L-shaped member slotted longitudinally at one end, this end being insertable down into the bore of the terminal post and being of exterior diameter approximately equal to the interior diameter of the bore, a bolt slidably extended down through the housing and the elbow of the L-shaped member and axially through the end thereof designed for insertion into the bore of the terminal post, a conical head on the end of the bolt located in this end of the tubular member, the base of this conical head being protruded through the lower slotted end of the tubular L-shaped member and being slightly larger in diameter than the interior diameter of the said slotted end, and means for drawing the bolt outwardly for forcing the base of the conical head thereof into the slotted end of the tubular member for expanding said end and firmly locking the device to the terminal post.

GEORGE W. REED.